United States Patent [19]

Kadohara et al.

[11] Patent Number: 5,079,581
[45] Date of Patent: Jan. 7, 1992

[54] AUTOMATIC FOCUS ADJUSTING APPARATUS

[75] Inventors: Terutake Kadohara; Akira Akashi, both of Yokohama; Ichiro Ohnuki, Kawasaki; Masaki Higashihara, Yokohama, all of Japan

[73] Assignee: Canon Kabushiki Kaisha, Tokyo, Japan

[21] Appl. No.: 583,002

[22] Filed: Sep. 17, 1990

Related U.S. Application Data

[63] Continuation of Ser. No. 346,638, May 3, 1989, abandoned.

[30] Foreign Application Priority Data

May 6, 1988 [JP] Japan .................................. 63-111340

[51] Int. Cl.⁵ ............................................. G03B 13/36
[52] U.S. Cl. ..................................... 354/400; 354/402; 354/195.1
[58] Field of Search ...................... 354/400, 402, 195.1

[56] References Cited

U.S. PATENT DOCUMENTS 4,783,677 11/1988 Hamada et al. ..................... 354/402
4,816,856 3/1987 Hamada et al. ..................... 354/400

Primary Examiner—Russell E. Adams
Attorney, Agent, or Firm—Fitzpatrick, Cella, Harper & Scinto

[57] ABSTRACT

A automatic focus detecting apparatus in which a focal point position corresponding to a change in position of an object after the elapse of a predetermined time is foreseen and calculated on the basis of the result of a past focal point adjustment. In accordance with the aperture value and lens characteristic at the time of photographing, a selection is made with respect to whether the calculation is executed in a normal mode to calculate the focal point position on the basis of only the result of the detection of the focal point at the present time independently of the result of the past focal point adjustment, or the calculation is executed in the foreseeing mode. Upon photographing, if there is no need to execute the foreseeing calculation, the focal point position is calculated in the normal mode.

17 Claims, 9 Drawing Sheets

AUTOMATIC FOCUS ADJUSTING APPARATUS

This application is a continuation of application Ser. No. 07/346,638 filed May 3, 1989 now abandoned.

BACKGROUND OF THE INVENTION

1. Field of the Invention

The present invention relates to an automatic focus adjusting apparatus which is used in a camera or the like.

2. Related Background Art

Hitherto, in most used in automatic focus adjusting systems of the single-lens reflex cameras, a focal point is set to an object by repetitively executing the cycles of "focal point detection (input of a sensor signal, detection and calculation of a focal point), and lens driving". A lens driving amount in each cycle calculated is based on a defocus amount at the time point when the focal point is detected in the cycle. This is because it is expected that the defocus amount at the time of the focal point detection is eliminated when the lens driving is finished.

Obviously, it takes a certain amount of time to detect the focal point and to drive the lens. However, in the case of a still object, the defocus amount does not change unless the lens is driven. Therefore, the defocus amount to be eliminated upon completion of the lens driving is equal to the defocus amount at the time when the focus detection was executed, and the focal point is accurately adjusted However, in the case of an object which is moving a high speed, the defocus amount changes during the focal point detection and the lens driving and the defocus amount to be eliminated is remarkably different from the detected defocus amount. Thus, there occurs a problem such that at the end of the lens driving, the focal point is not set to the object.

As automatic focus adjusting methods to solve the above problems, there have been proposed such methods as disclosed in JP-A-62-125311, JP-A-62-139512, JP-A-62-139511, Japanese Patent Application No. 62-293576, and the like.

It is the gist of the methods disclosed in those applications that a change of the defocus amount caused by the movement of an object is foreseen considering a change of the detected defocus amount in each of the foregoing detection cycles and a time interval between the cycles, thereby correcting the lens driving amount. It is expected that the above problems are alleviated by the above methods from the viewpoint of the accuracy of the focal point at the end of the driving of the lens.

FIG. 9 is a diagram for explaining a lens driving amount correcting method according to the above foreseeing method disclosed in Japanese Patent Application No. 62-293576. In the diagram, the of abscissa denotes a time t and the of ordinate indicates an imaging plane position d of an object.

A locus f(t) shown by a solid line denotes an imaging plane position of the object and a locus l(t) shown by a broken line indicates the imaging plane position of the lens.

Explaining in more detail, f(t) denotes the imaging plane position at time t where the object approaches the camera in the direction of the optical axis when the focus adjusting optical system of the photographing lens images the focal point to an infinite position. l(t) represents the imaging plane position of the same object at the focus adjusting optical system position at time t. An interval $[t_i, t_i']$ corresponds to the focus detecting operation and $[t_i', t_{i+1}]$ corresponds to the lens driving operation.

Therefore, the difference in the d direction on the ordinate between f(t) and l(t) at the same time t denotes what is called a defocus amount. $DF_i$ indicates a defocus amount detected at time $t_i$, $DL_i$ denotes a lens driving amount based on the imaging plane position conversion which was executed from the result of the detection of the focal point at time $t_{i-1}$, and $TM_i$ represents a time interval of the focus detecting operations.

In the example shown in FIG. 9, as a prerequisite to executing the correcting calculation, it is assumed that the imaging plane position of the object changes in accordance with the quadratic function $at^2+bt+c$. That is, at time $t_3$, if the present and past three imaging plane positions $(t_1, f_1)$, $(t_2, f_2)$, and $(t_3, f_3)$ are known, the imaging plane position $f_4$ at time $t_4$ can be predicted.

However, what can be detected by the camera are not the imaging plane positions $f_1$, $f_2$, and $f_3$ but the defocus amounts $DF_1$, $DF_2$, and $DF_3$ and the lens driving amounts $DL_1$ and $DL_2$ based on the imaging plane movement amount conversion. Further, the value at time $t_4$ is a value in the future. Actually, when the accumulating time of an accumulating type sensor changes due to the luminance of the object, such a future value also changes. When an imaging plane position $f_4$ at time $t_4$ is determined, it is assumed for simplicity of explanation that the $f_4$ has already been known from the relation of $t_4-t_3=t_3-t_2$.

Under such an assumption, the lens driving based on the imaging plane movement amount conversion when executing the lens driving at time $t_3'$ toward time $t_4$ from the result of the focus detection at time $t_3$ is obtained in the following manner.

$$a \cdot t^2 + b \cdot t + c = f(t) \tag{1}$$

$$a \cdot t_1^2 + b \cdot t_1 + c = f(t_1)$$

$$a \cdot t_2^2 + b \cdot t_2 + c = f(t_2) \tag{2'}$$

$$a \cdot t_3^2 + b \cdot t_3 + c = f(t) \tag{2''}$$

In FIG. 9, when it is considered that point $l_1$ is an origin, $$f_1 = DF_1 \tag{3}$$

$$f_2 = DF_2 + DL_1 \tag{3'}$$

$$f_3 = DF_3 + DL_2 + DL_1 \tag{3''}$$

$$t_1 = 0 \tag{4}$$

$$t_2 = TM_1 \tag{4'}$$

$$t_3 = TM_1 + TM_2 \tag{4''}$$

By substituting the equations (3), (3'), (3''), (4), (4'), and (4'') for the equations (2), (2'), and (2''), then a, b, and c are obtained.

$$a = \frac{DF_3 + DL_2 - DF_2}{(TM_1 + TM_2) \cdot TM_2} + \frac{DF_1 - DL_1 - DF_2}{(TM_1 + TM_2) \cdot TM_1} \tag{5}$$

$$b = \frac{DF_2 + DL_1 - DF_1 - a \cdot TM_1^2}{TM_1} \tag{6}$$

-continued $$c = DF_1 \quad (7)$$

Therefore, the lens driving amount $DL_3$ based on the imaging plane movement amount conversion at time $t_4$ is as follows.

$$\begin{aligned}
DL_3 &= f_4 - l_3 \quad (8)\\
&= f_4 - (f_3 - DF_3)\\
&= a \cdot (TM_1 + TM_2 + TM_3)^2 + b \cdot (TM_1 + TM_2 + TM_3) + c - \{a \cdot (TM_1 + TM_2)^2 + b \cdot (TM_1 + TM_2) + c\} + DF_3\\
&= a\{(TM_1 + TM_2 + TM_3)^2 - (TM_1 + TM_2)^2\} + b \cdot TM_3 + DF_3
\end{aligned}$$

As mentioned above, the $TM_3$ is already known from the relation of $TM_3 = TM_2$ and the $DL_3$ is obtained from the equation (8). In a manner similar to the above, the lens driving amount at time $t$ after time $t_4$ can be also obtained from the past three detected defocus amounts $DF_{n-2}$, $DF_{n-1}$, and $DF_n$, the past two actual lens driving amounts $DL_{n-2}$ and $DL_{n-1}$, and the past two time intervals $TM_{n-2}$ and $TM_{n-1}$.

$$a_n = \frac{DF_n + DL_{n-1} - DF_{n-1}}{(TM_{n-2} + TM_{n-1})TM_{n-1}} + \frac{DF_{n-2} - DL_{n-2} - DF_{n-(9)}}{(TM_{n-2} + TM_{n-1})TM_{n-2}}$$

$$b_n = \frac{DF_{n-1} + DL_{n-2} - DF_{n-2} - a_n \cdot TM_{n-2}^2}{TM_{n-2}} \quad (10)$$

$$DL_n = a_n\{(TM_{n-2} + TM_{n-1} + TM_n)^2 - (TM_{n-2} + TM_n - 1)^2\} + b_n \cdot TM_n + DF_n \quad (11)$$

If the lens driving amount $DL_n$ to drive the lens is obtained from the detected defocus amount $DF_n$ in accordance with the equations (9), (10), and (11) and the lens is driven on the basis of the $DL_n$, a focal point can be always accurately obtained at the end of the lens driving even for a moving object.

However, when photographing is executed by actually using the foregoing foreseeing method, the following problems occur.

That is, in the optical system of a camera or the like, when a focal point is set to an object located at a certain distance, it is well known that there is a "focal depth" covering before and behind the imaging plane (focal plane) and within which the image forming state can be regarded to be sufficiently clear for practical use. If the focal depth sufficiently exceeds the effect by the foreseeing operation, the photographing can be executed in a state in which the focal point is accurately set to the object without needing to use the correcting means.

FIG. 2 is an explanatory diagram showing the imaging plane position f(t) of an object V(t) when the automatic focusing operation is executed for an object which approaches toward the camera at a constant speed without using the foregoing foreseeing method and the focal plane position l(t) of the lens obtained by the automatic focusing. The difference $e(t) = f(t) - l(t)$ between the imaging plane position f(t) of the object V(t) and the focal plane position l(t) corresponds to the focusing error. FIG. 3 is an explanatory diagram showing the difference $e'(t) = f(t) - l'(t)$ between the imaging plane position f(t) of the object V(t) and the lens focal plane position l'(t) in the case where the above foreseeing method is used. As will be obvious from FIGS. 3 and 2, there is the relation of e(t) > e'(t) between the focusing errors e'(t) and e(t). The focusing apparatus using the foreseeing method more accurately executes the focusing operation for the object. The difference e(t) − e'(t) becomes the focusing error between the cases where the foreseeing method is used and where it is not used.

As the value of the difference e(t) − e'(t) is larger, the effect of the foreseeing method is larger.

FIG. 4 is an explanatory diagram showing the relation between the difference e(t) − e'(t) and the focal depth for a certain aperture value. E denotes one side of the focal depth.

A deviation at the imaging plane position under the line E corresponds to the region in which practical problems will not occur. Therefore, as shown in FIG. 4, if E sufficiently exceeds the effect e(t) − e'(t) of the foreseeing method, the result equal to or better than that in the case where the foreseeing process wa executed can be obtained without performing the foreseeing process.

As mentioned above, in connection with the focal depth, there is a situation therein the same result of the focusing state is obtained regardless of whether the foreseeing method was used or not. However, in the case of the above apparatus which has conventionally been proposed, when the foreseeing calculating mode is set, the foreseeing calculation is always executed without exception. Thus, there is a drawback such that even in the case where it is possible to obtain a in-focus state without execution of foreseeing calculation as mentioned above, the foreseeing calculation is executed, so that the processing time becomes long.

SUMMARY OF THE INVENTION

According to one aspect of the invention, it is an object of the invention to provide an automatic focusing apparatus in which whether the automatic focusing operation according to the foreseeing calculating process should be executed or not is determined in accordance with various kinds of characteristics such as a lens driving characteristic and the like.

According to another aspect of the invention, it is another object of the invention to provide an automatic focusing apparatus in which whether the automatic focusing operation according to the foreseeing calculating process should be executed or not is determined on the basis of a value of an exposure determination factor.

According to still another aspect of the invention, it is yet another object of the invention to provide an automatic focusing apparatus in which whether the automatic focusing operation according to the foreseeing calculating process should be executed or not is determined on the basis of an aperture value.

The above and other objects and features of the present invention will become apparent from the following detailed description and the appended claims with reference to the accompanying drawings. BRIEF DESCRIPTION OF THE DRAWINGS FIG. 1 is an explanatory diagram showing a program for explaining the operation of an automatic focus adjusting apparatus according to the present invention;

FIGS. 2, 3, and 4 are explanatory diagrams for explaining the principle of the invention;

FIG. 5 is a circuit diagram showing an embodiment of an automatic focus adjusting apparatus according to the invention;

FIGS. 6, 7, and 8 are explanatory diagrams showing subroutines in the program shown in FIG. 1; and FIG. 9 is an explanatory diagram for explaining the foreseeing calculating operation which is used in the invention.

DETAILED DESCRIPTION OF THE PREFERRED EMBODIMENT

An embodiment of a focusing apparatus according to the present invention will be described.

First, prior to explaining the embodiment, the principle of the invention will be explained. First, as mentioned above, the effect of the foreseeing process for each lens is obtained. A specific aperture value ($A_0$) exceeding the effect of the foreseeing process is also obtained and stored in a memory or the like in the lens. The aperture value $A_0$ is sent to the camera by the camera/lens communication which is executed when the power of the camera is turned on in a state in which the lens is attached to the camera or after the lens was exchanged in the power-ON state, or the like. The aperture value $A_0$ is also stored in a memory or the like on the camera. In the actual photographing, at the prestage of the foreseeing calculation in the camera, it is determined whether the foreseeing calculation should be executed or not. That is, a photographing aperture value ($A_v$) obtained by the photometering operation is compared with the stored $A_0$. If $$A_v \geq A_0 \ (A_v \text{ is an apex value}) \quad (A)$$

that is, if the photographing aperture value is equal to or larger than the aperture value with the focal depth exceeding the effect of the foreseeing process, the foreseeing calculation is not executed. On the other hand, if $$A_v < A_0 \quad (B)$$

that is, if the focal depth of the photographing aperture value does not reach a value exceeding the effect of the foreseeing process, the foreseeing calculation is executed.

As mentioned above, in the embodiment, whether the foreseeing calculation is executed or not is determined by comparing $A_v$ and $A_0$, thereby preventing an execution of wasteful foreseeing calculating process.

The aperture value $A_0$ is determined by obtaining an aperture value in such a manner that the maximum imaging plane movement amount (the maximum deviation amount) lies within a depth of field in the case where the imaging plane was moved during the time corresponding to the time lag (assumed to be constant) between the completion of the lens driving using the ordinary automatic focusing operation at the imaging plane moving speed corresponding to the movement of the lens in the ordinary automatic focusing operation and the start of the actual exposure. The a above-mentioned aperture value is determined in accordance with a factor determining the imaging plane moving speed of each lens or the time lag as mentioned above. Therefore, the aperture value can be previously calculated and stored in a memory in the lens apparatus.

An explanation will now be given in detail hereinbelow with respect to the focusing apparatus of the invention for executing the discrimination to determine if the foreseeing calculating process should be executed or not.

Figure 5:
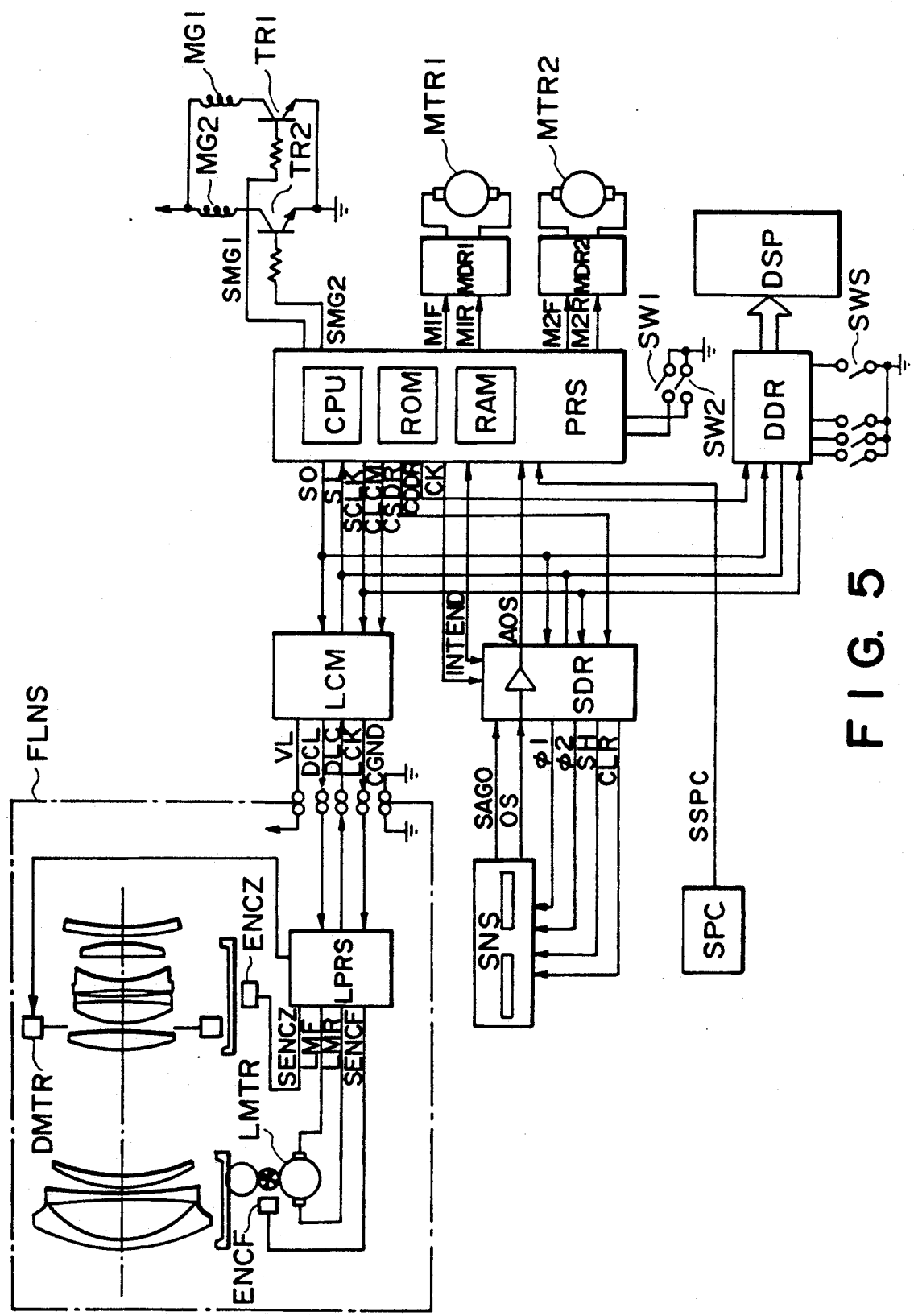

FIG. 5 is a circuit diagram showing an embodiment of a camera having an automatic focusing apparatus according to the invention.

In the diagram, PRS denotes a control apparatus of the camera and is, for instance, a one-chip microcomputer having therein a CPU (Central Processing Unit), a ROM a RAM, and an A/D converting function. In accordance with a sequence program of the camera stored in the ROM, the computer PRS executes a series of operations of the camera such as automatic exposure control function, automatic focus adjusting function, film winding and rewinding operations, and the like. For this purpose, the computer PRS communicates with the peripheral circuits in the camera main body and with the controller in the lens by using signals SO, SI, and SCLK for communication and communication selection signals CLCM, CSDR, and CDDR, thereby controlling the respective circuits and the operation of the lens.

SO denotes the data signal which is output from the computer PRS, SI indicates the data signal which is input to the computer PRS, and SCLK represents the sync clock of the signals SO and SI.

LCM denotes the lens communication buffer circuit. During the operation of the camera, the buffer circuit LCM supplies an electric power through a power terminal VL for the lens. When the selection signal CLCM from the computer PRS is set to the high potential level (hereinafter, abbreviated as an "H" and the low potential level is abbreviated as an "L"), the buffer circuit LCM functions as a communication buffer between the camera and the lens.

When the computer PRS sets the selection signal CLCM to "H" and allows predetermined data to be transmitted from the SO synchronously with the sync clock SCLK, the buffer circuit LCM outputs buffer signals LCK and DCL of the SCLK and SO to the lens through the camera/lens communicating contacts. At the same time, the buffer signal of the signal DLC from the lens is output to the SI. The computer PRS receives the data from the lens through SI synchronously with the SCLK.

SDR denotes a drive circuit of a line sensor SNS for focus detection constituted by a CCD and the like. When the signal CSDR is set to "H", the drive circuit SDR is selected and is controlled by the computer PRS by using SO, SI, and SCLK. A signal CK is a clock to produce CCD driving clocks $\phi_1$ and $\phi_2$. A signal INTEND is used to inform the computer PRS of the completion of the accumulating operation.

An output signal OS from the sensor SNS is a time sequential image signal synchronized with the clocks $\phi_1$ and $\phi_2$, and which is amplified by an amplifying circuit in the drive circuit SDR and is output as an AOS to the computer PRS. The computer PRS receives the AOS from an analog input terminal and converts it into the digital signal by the internal A/D converter synchronously with the CK signal and sequentially stores it at a predetermined addresses in the RAM.

Likewise, an output signal SAGC of the sensor SNS is an output of an AGC (Automatic Gain Control) sensor in the sensor SNS and is input to the drive circuit SDR and is used for the accumulation control of the sensor SNS.

SPC denotes a photometric sensor for the exposure control which receives the light from an object through the photographing lenses. An output SSPC of the sensor SPC is input to the analog input terminal of the computer PRS and is A/D converted. Thereafter, it is used for the automatic exposure control in accordance with a stored program.

DDR denotes a circuit for the switch detection and display. When the signal CDDR is set to "H", the circuit DDR is selected and controlled by the computer PRS by using SO, SI, and SCLK. That is, on the basis of the data sent from the computer PRS, the indication of a display DSP of the camera is changed and the on/off states of various kinds of operating members of the camera are provided to the computer PRS by communication.

$SW_1$ and $SW_2$ denote switches interlocked with a release button (not shown). The $SW_1$ is turned on by the depression of the first stage of the release button and the $SW_2$ is then turned on by the depression of the second stage. The computer PRS executes the photometering operation and automatic focus adjustment upon turning on of the $SW_1$ and performs the exposure control upon turning on of the $SW_2$ as a trigger.

The $SW_2$ is connected to an "interruption input terminal" of the microcomputer PRS. Even during the execution of the program at the turn-on of the $SW_1$, the interruption is executed by the turn-on of the $SW_2$ and the control according to a predetermined interrupting program can be immediately performed.

$MTR_1$ denotes a motor to feed a film and $MTR_2$ indicates a motor to move a mirror up and down and to charge a shutter spring. The forward and reverse rotations of the motors $MTR_1$ and $MTR_2$ are controlled by motor drive circuits $MDR_1$ and $MDR_2$, respectively. Signals M1F, M1R, M2F, and M2R which are input from the computer PRS to the $MDR_1$ and $MDR_2$ are motor control signals.

$MG_1$ and $MG_2$ respectively denote magnets to start the operation of first-shutter curtain and the operation of a second-shutter curtain. $MG_1$ and $MG_2$ are energized by signals $SMG_1$, $SMG_2$, and amplifying transistors $TR_1$, $TR_2$, and the shutter operation is controll by the computer PRS.

Since the switch detecting and displaying circuit DDR, motor drive circuits $MDR_1$ and $MDR_2$, and shutter control are not directly concerned with the invention, their detailed descriptions are omitted.

A signal DCL input to a lens-inside control circuit LPRS synchronously with LCK is command data from the camera to a lens FLNS. The lens operations responsive to the commands are predetermined. The control circuit LPRS analyzes the command in accordance with a predetermined procedure and executes the focus adjusting operation and aperture control operation and outputs a signal indicative of the operating state of each section (driving state of the focus adjusting optical system, aperture driving state, or the like) of the lens from an output DLC and also outputs various parameters (open F number, focal distance, coefficient of the movement amount of the focus adjusting optical system to the defocus amount, etc.).

In the embodiment, an example of a zoom lens is shown. In the case where a command for the focus adjustment is sent from the camera, a focus adjusting motor LMTR is driven by signals LMF and LMR in accordance with signals indicative of the driving amount and the driving direction which are simultaneously transmitted. The optical system is moved in the optical axis direction and the focus adjustment is executed. The movement amount of the optical system is obtained by monitoring a pulse signal SENCF of an encoder ENCF and counting by a counter in the LPRS. After completion of a prospected movement, the LPRS itself sets the signals LMF and LMR to "L" and brakes the motor LMTR.

Therefore, once the focus adjustment instruction has been sent from the camera, the control apparatus PRS of the camera does not need to perform the control of the lens driving until completion of the lens driving. On the other hand, if a request is made by the camera, the content of the counter can be also transmitted to the camera.

When an aperture control command is sent from the camera, a stepping motor DMTR which is well known as a motor for the aperture driving is driven in accordance with the aperture step number which is simultaneously sent. Since the stepping motor can be open controlled, the encoder to monitor the operation is unnecessary.

ENCZ denotes an encoder provided for the zoom optical system. The control circuit LPRS receives a signal SENCZ from the ENCZ and detects the zoom position. Lens parameters at the respective zoom positions are stored in the LPRS. When a request command is sent from the computer PRS on the camera side, the parameter corresponding to the present zoom position is sent to the camera.

Figure 6:
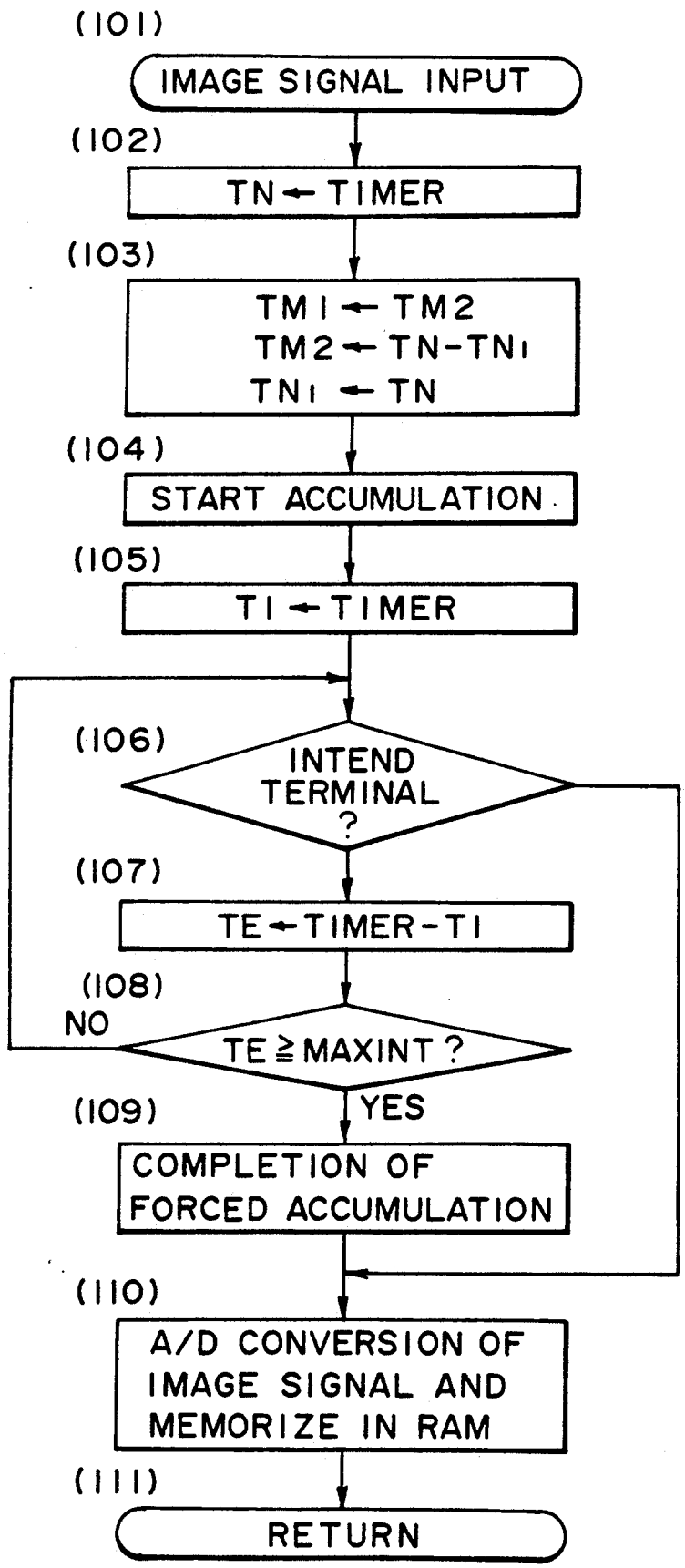

The operation of the camera with the structure of FIG. 5 will now be described with reference to flowcharts of FIGS. 1 and 6 and subsequent figures.

When a power switch (not shown) is turned on, the current supply to the microcomputer PRS is started and the computer PRS starts the execution of the sequence program stored in the ROM.

Figure 1:
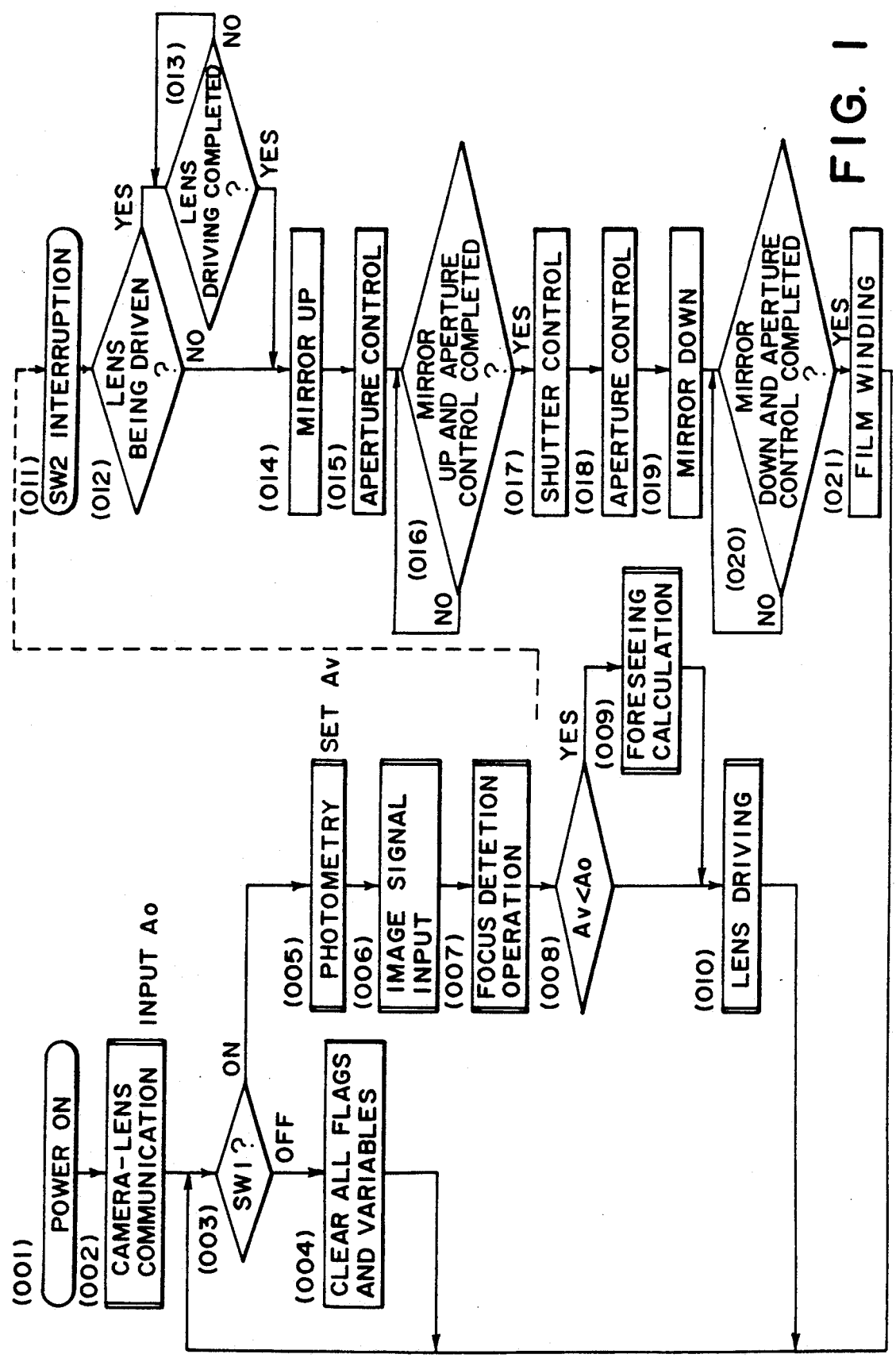
Figure 2:
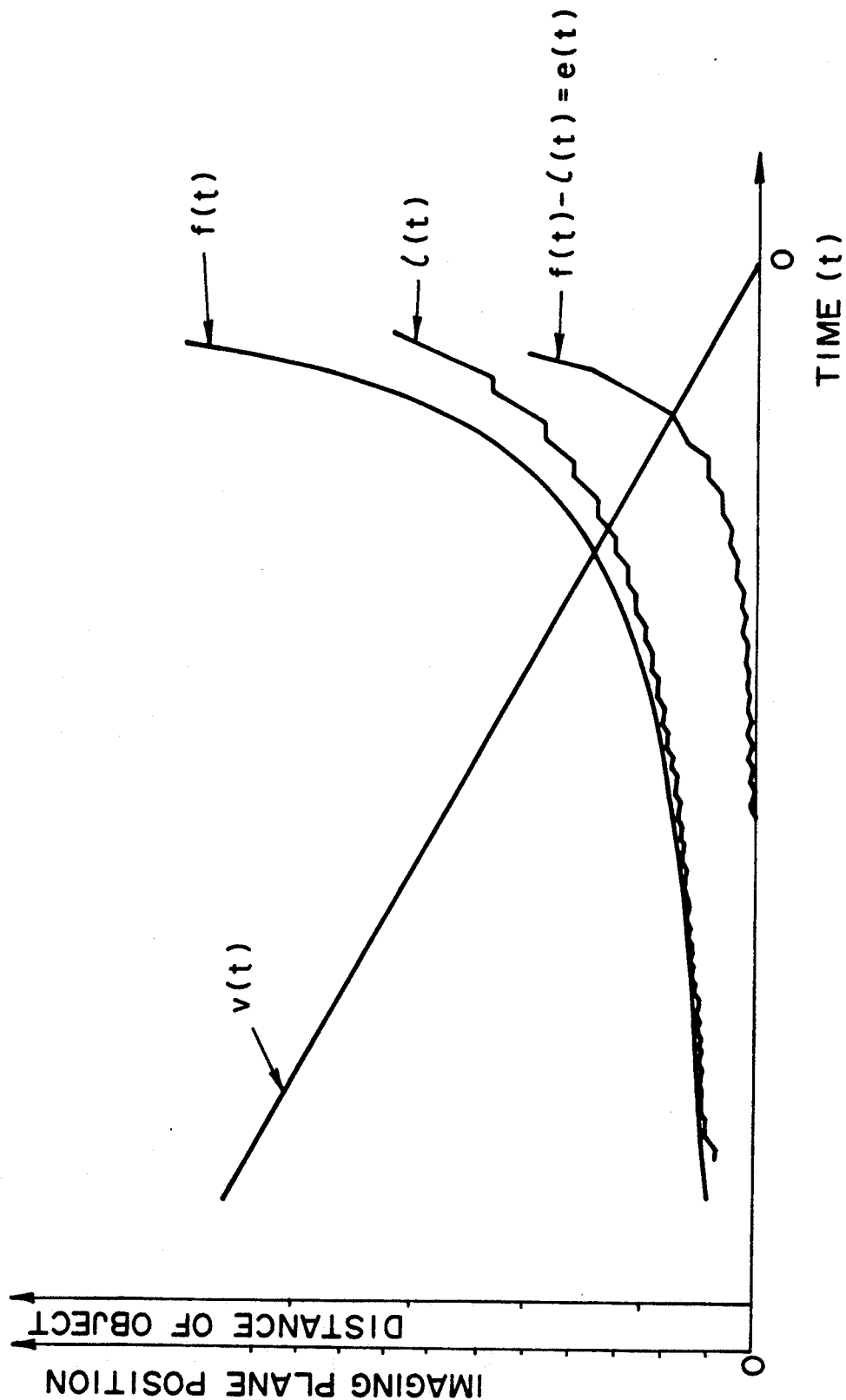
Figure 3:
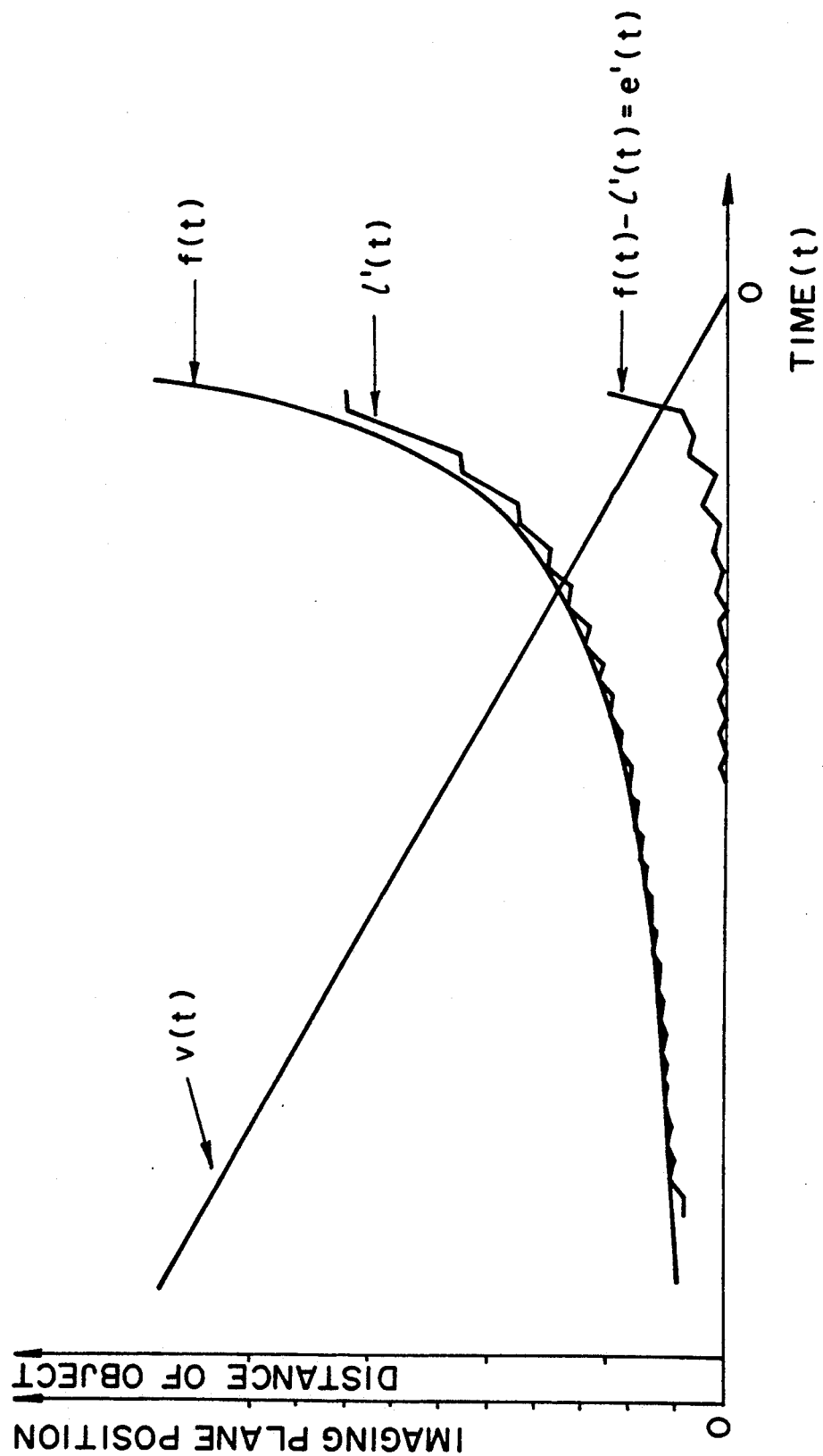
Figure 4:
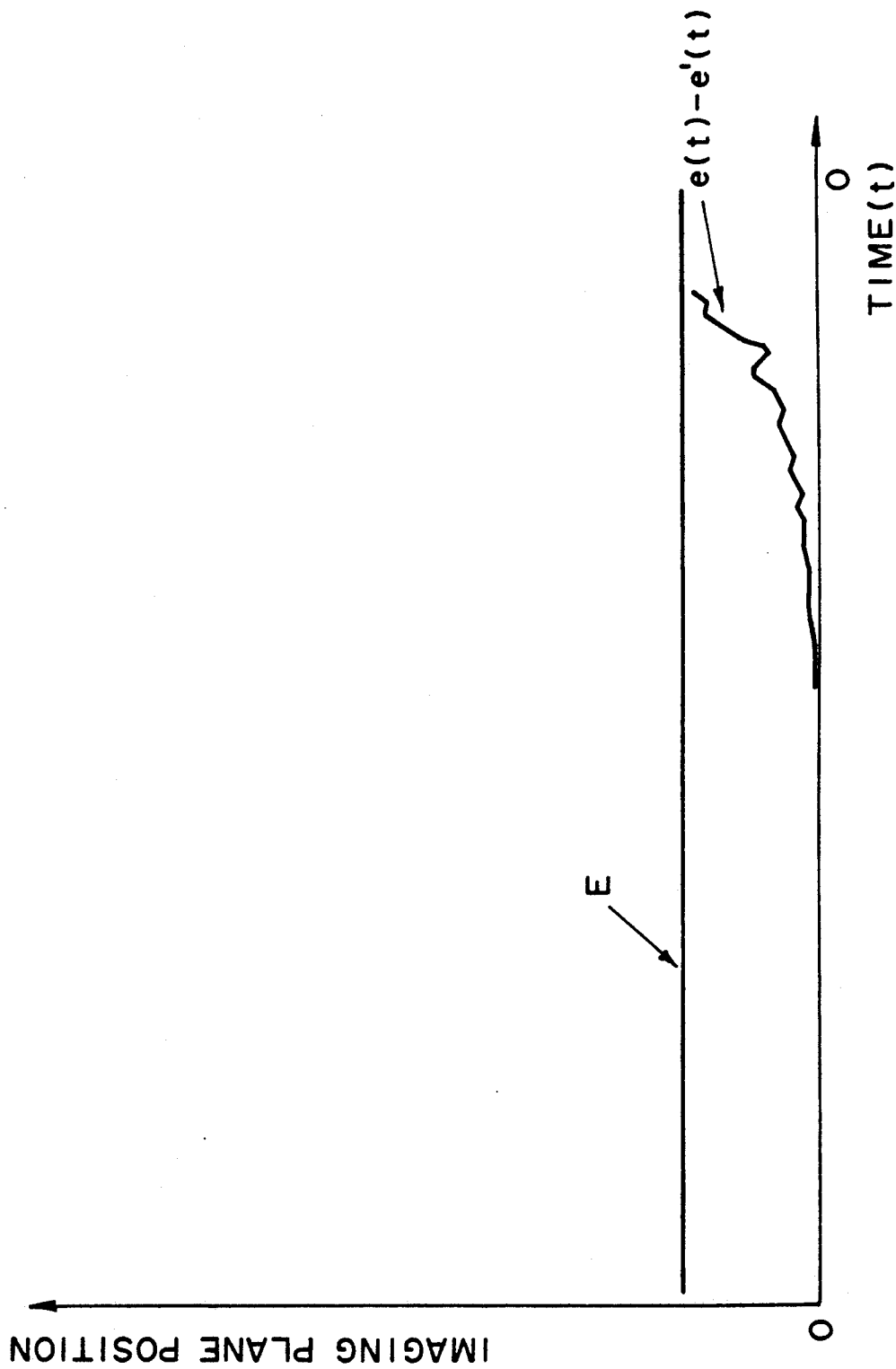

FIG. 1 is a flowchart showing a total flow of the program. When the execution of the program is commanded by the above operation, the communication between the camera and the lens is executed in step (002) through step (001). By this communication, the parameters and the like concerning the lens are input to the camera. The aperture value ($A_0$) which is peculiar to each lens and is basic data for determining the execution of the foreseeing calculating process is also input to the camera in the step (002). Each input data is stored at a predetermined address in the RAM of the camera.

In step (003), the state of the switch $SW_1$ which is turned on by the depression of the first step of the release button is detected. When the $SW_1$ is OFF, step (004) follows and all of the control flags and variables set in the RAM in the PRS are cleared and the initialization is performed.

The processes in steps (003) and (004) are repetitively executed until the switch $SW_1$ is turned on or the power switch is turned off. When the $SW_1$ is turned on, the processing routine advances from step (003) to step (005).

In step (005), a "photometric" subroutine for the exposure control is executed. The PRS receives the output SSPC of the photometric sensor SPC shown in FIG. 5 at the analog input terminal and A/D converts the output SSPC into the digital signal. The PRS then calculates the optimum shutter control value and aperture control value on the basis of the digital photometric value and stores them at predetermined addresses in the RAM. In the releasing operation, the shutter and aperture controls are executed on the basis of those values. Thus, the photographing aperture value ($A_v$) is determined. In the next step (006), an "image signal input" subroutine is performed. A flowchart of this subroutine is shown in FIG. 6. The computer PRS receives the image signal from the sensor SNS for the focus detection. Its details will be explained hereinlater.

In the next step (007), a defocus amount DEF of the photographing lenses is calculated on the basis of the input image signal obtained by executing the "focus detection" subroutine. Although a practical calculating method is omitted, the defocus amount is calculated by the well-known algorithm disclosed in detail in the Official Gazette of Japanese Patent Application No. 61-160824 or the like.

In the next step (008), a check is made to see if the foreseeing calculation mentioned above is executed or not. The aperture value $A_v$ obtained by the photometering operation is compared with the discrimination reference value $A_0$. If $A_v < A_0$, that is, when the aperture value used to photograph is small and the depth is shallow, and therefore the foreseeing has to be performed, the processing routine advances to step (009) and the "foreseeing calculation" is executed. If it is determined that the depth is deep and the foreseeing operation should be inhibited, the processing routine advances to step (010) and the lens is driven on the basis of the defocus amount obtained in step (007).

Figure 8:
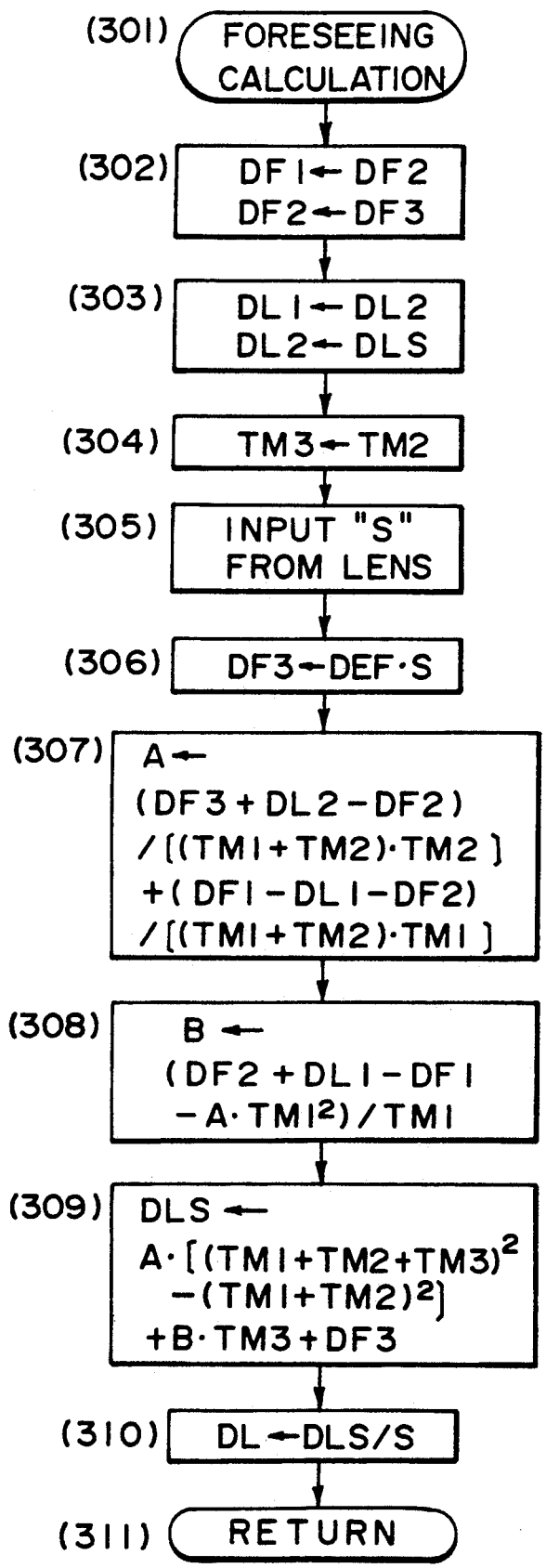
Figure 9:
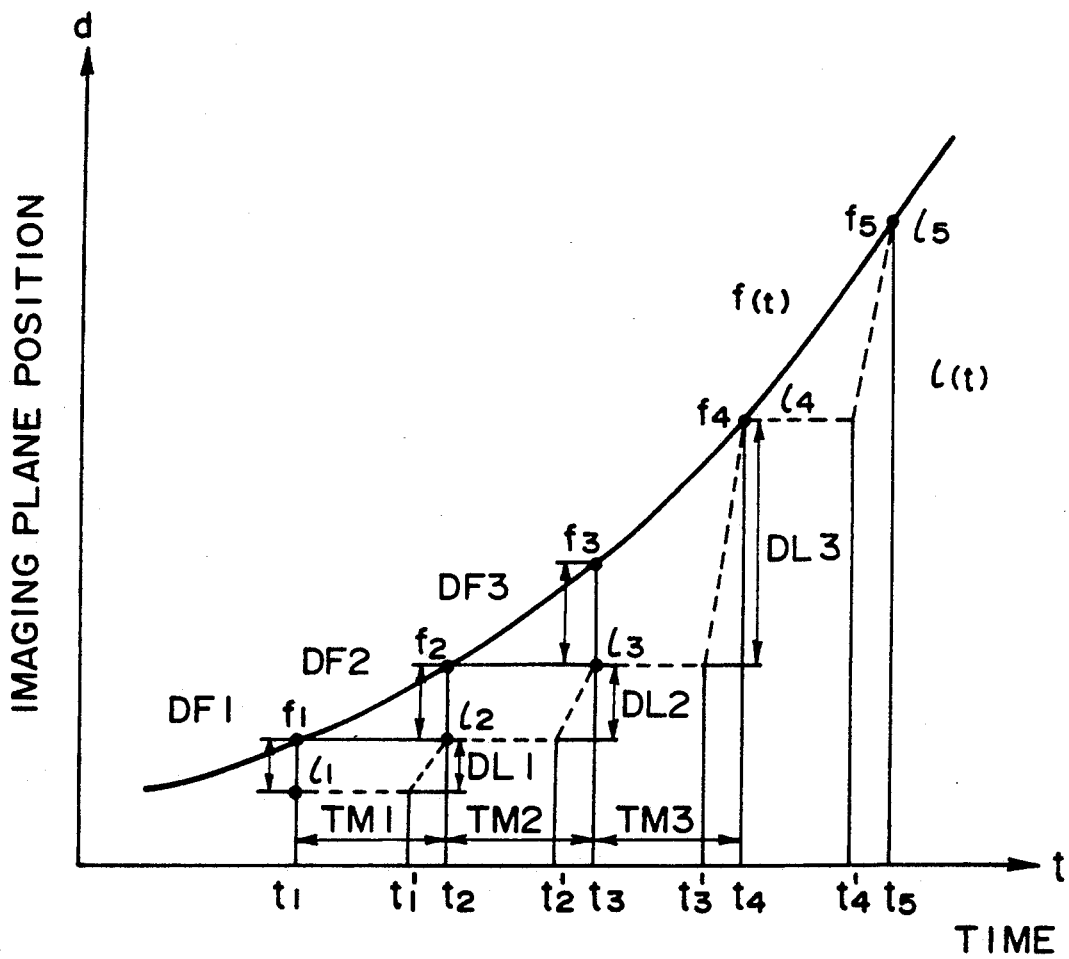

In step (009), a "foreseeing calculation" subroutine is executed. The "foreseeing calculation" subroutine intends to effect a correction to the lens driving amount based on the defocus amount obtained in step (007). Its flow is shown in FIG. 8.

Figure 7:
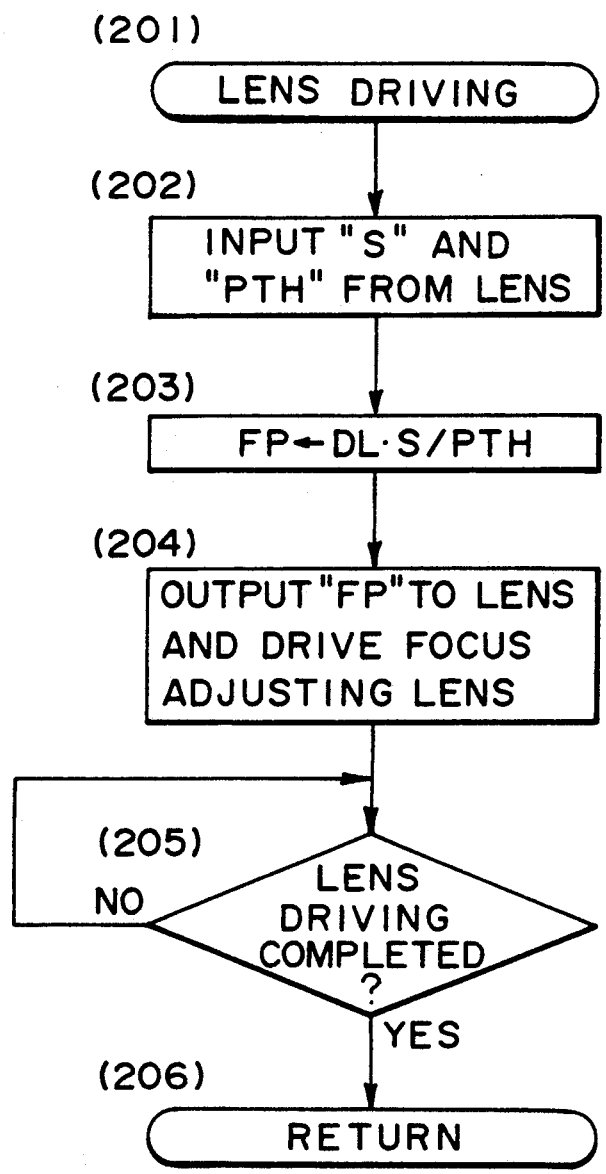

In step (010), a "lens driving" subroutine is executed. In this step, the lens is driven on the basis of the defocus amount obtained in step (007) or the amount obtained by correcting the defocus amount obtained in step (009). A flow of the "lens driving" subroutine is shown in FIG. 7.

After completion of the lens driving, the processing routine again advances to step (003) and the processes in steps (005) to (010) are repetitively executed until the $SW_1$ is turned off, and preferred focus adjustment is executed even for a moving object.

As already described, the switch $SW_2$ which is turned on by the depression of the second level of the release button is connected to an interruption input terminal of the computer PRS. When the $SW_2$ is turned on, the processing routine immediately advances to step (011) by the interrupting function even during the execution of any step. That is, the processes from steps (011) to (021) executed upon interruption of turning on of the $SW_2$ correspond to a series of releasing operations, and after a completion of releasing operations, the processing routine is returned to step (003). The releasing operations will now be described hereinbelow.

First, when the release button is further depressed and the switch $SW_2$ is turned on, the processing routine immediately advances to step (011) by the interrupting function even during the execution of any step and the releasing operation is started.

In step (012), a check is made to judge if the interruption has occurred by turn-on of the switch $SW_2$ during the lens driving operation or not. If YES in step (012), step (013) follows and the process waits until the lens driving operation is completed. That is, when the lens is not driving, or when the lens driving operation is completed, the processing routine advances to step (014).

In step (014), a quick return mirror of the camera is moved up by controlling the motor $MTR_2$ through the drive circuit $MDR_2$ by using the motor control signals M2F and MSR shown in FIG. 5.

In the next step (015), the aperture control value (the value based on the photographing aperture value $A_v$) which has already been stored in the photometric subroutine in step (005) is transmitted to the lens, thereby allowing the lens to execute the aperture control.

In step (016), a check is made to see if the mirror has been moved up or not in step (014) and a check is also made to see if the aperture control has been completed or not in step (015). In general, it takes several tens of milliseconds to perform both of those controls. Such a time becomes a main cause of what is called a release time lag. Whether the mirror has been moved up or not can be checked by a sensor switch (not shown) attached to the mirror. On the other hand, the completion of the aperture control can be checked by discriminating whether the lens was driven to a predetermined aperture value ($A_v$) or not through the communication with the lens. If either one of the mirror-up operations and the aperture control is not yet completed, the process waits in this step and subsequently detects the condition. If the completion of both of those controls is confirmed, step (017) follows and at this time, the preparation of the exposure is completed.

In step (017), the shutter control is executed on the basis of the shutter control value which has already been stored by the "photometric" subroutine in step (005) and the film is exposed.

After completion of the shutter control, step (018) follows and an instruction is transmitted to the lens so as to open the aperture. In the next step (019), the quick return mirror is moved down. In a manner similar to the mirror-up operation, the mirror can be moved down by controlling the motor $MTR_2$ by using the motor control signals M2F and M2R.

In the next step (020), in a manner similar to step (016), a check is made to see if the mirror has been moved down and a check is also made to see if the aperture opening control has been finished or not. If both of those controls have been completed, step (021) follows.

In step (021), by properly controlling the motor control signals M1F and M1R shown in FIG. 5, the film is wound up by one frame. Detailed descriptions of the operation in this operation are omitted here.

As mentioned above, a series of releasing operations are finished.

The "image signal input" subroutine shown in FIG. 6 will now be described. The "image signal input" operation is executed at the beginning of the cycle of each focus adjusting operation. When this subroutine is called, in step (102) after step (101), a timer value TIMER of a free-running timer provided in the microcomputer PRS itself is stored in a memory area TN in the RAM, thereby storing the start time of the focus adjusting operation.

In step (103), the $TM_1$ and $TM_2$ corresponding to the time intervals $TM_{n-2}$ and $TM_{n-1}$ in lens driving amount correcting equations (9), (10), and (11), which will be explained hereinlater, are updated. Prior to executing the process of step (103), the time intervals $TM_{n-2}$ and $TM_{n-1}$ in the preceding focus adjusting operation are stored in the $TM_1$ and $TM_2$. On the other hand, the start time of the preceding focus adjusting operation is stored in the $TN_1$.

Therefore, by executing step (103), $TM_1$ indicates the time interval from the two-preceding focus adjusting operations to the preceding focus adjusting operation. $TM_2=TN-TN_1$ denotes the time interval from the preceding focus adjusting operation to the present focus adjusting operation. The values of $TM_1$ and $TM_2$ are stored in the memory areas $TM_1$ and $TM_2$ in the RAM corresponding to $TM_{n-2}$ and $TM_{n-1}$ in the equations (9), (10), and (11). The present time TN is stored into the $TN_1$ for the next focus adjusting operation.

In the next step (104), the accumulation of the optical image is started by the sensor apparatus SNS. Practically speaking, the microcomputer PRS sends an "accumulation start command" to the sensor drive circuit SDR by the communication. In response to this command, the SDR sets a clear signal CLR of the photoelectric converting device section of the sensor apparatus SNS to "L", thereby starting the accumulation of the charges.

In step (105), the timer value of the self-running timer is stored in a variable TI and the present time is stored.

In the next step (106), the state of an input INTEND terminal of the PRS is detected and a check is made to see if the accumulation has been finished or not. Simultaneously with the start of the accumulation, the sensor drive circuit SDR sets the signal INTEND to "L" and monitors an AGC signal SAGC from the SNS. When the SAGC reaches a predetermined level, the SDR sets the signal INTEND to "H" and simultaneously sets a charge transfer signal SH to "H" for a predetermined time, thereby allowing the charges in the photoelectric converting device section to be transferred to the CCD section.

If the INTEND terminal is set to "H" in step (106), this means that the accumulation has been completed, and the process advances to step (110). If it is "L", since the accumulation is not yet finished, step (107) follows.

In step (107), the time TI stored in step (105) is subtracted from the timer value TIMER of the self-running timer and the resultant value is stored in a variable TE. Therefore, the time from the start of the accumulation to the present time, what is called an "accumulating time" is stored in the TE.

In the next step (108), the TE and a constant MAXINT are compared and if TE is smaller than MAXINT, the processing routine is returned to step (106) and the process again waits for completion of the accumulation. When TE exceeds MAXINT, step (109) follows and the accumulation is forcedly finished by sending an "accumulation end command" from the PRS to the SDR.

When the "accumulation end command" is sent from the PRS, the SDR sets the charge transfer signal SH to "H" for a predetermined period of time, thereby allowing the charges accumulated in the photoelectric converting section to be transferred to the CCD section. The accumulating operation of the sensor is finished by the flow until step (109).

In step (110), a signal AOS obtained by amplifying an image signal OS of the sensor apparatus SNS by the sensor drive circuit SDR is A/D converted and the resultant digital signal is stored in the RAM. When explaining in more detail, the SDR produces the CCD driving clocks $\phi_1$ and $\phi_2$ synchronously with the clock CK from the PRS and gives them to the control circuit in the SNS. The CCD section in the sensor apparatus SNS is driven by the clocks $\phi_1$ and $\phi_2$ and the charges in the CCD are time sequentially output as the image signal from the output OS. The image signal is amplified by an amplifier in the control circuit SDR. Thereafter, it is input as the signal AOS to the analog input terminal of the PRS. The computer PRS performs the A/D conversion synchronously with the clock CK which is generated from the PRS itself. The A/D converted digital image signal is sequentially stored at a predetermined address in the RAM.

After the image signal was input as mentioned above, the "image signal input" subroutine is returned in step (111).

FIG. 7 shows a flowchart for a "lens driving" subroutine. When this subroutine is executed, in step (202), the communication is made with the lens and two data "S" and "PTH" are input. "S" denotes a coefficient of the movement amount of the imaging plane to the movement amount of the focus adjusting optical system of the photographing lenses. That is, "S" indicates the imaging plane movement amount of the photographing lenses when the focus adjusting optical system of the photographing lenses was moved in the optical axis direction by a unit length. For instance, in the case of a single lens of the whole protruding type, since the whole photographing lens corresponds to the focus adjusting optical system, the movement of the focus adjusting optical system is equal to the imaging plane movement of the photographing lens, so that $S=1$. In the case of zoom lenses, S changes in dependence on the position of the zoom optical system. The position of the zoom optical system is detected by the output SENCZ of the encoder ENCZ and "S" according to the zoom state is derived. On the other hand, "PTH" denotes the movement amount of a focus adjusting optical system LNS per one output pulse of the encoder ENCF which is interlocked with the movement in the optical axis direction of the optical system LNS.

Therefore, the value which is obtained by converting the movement amount of the focus adjusting optical system into the number of output pulses of the encoder by the defocus amount DL to be focus adjusted and by the S and PTH, that is, what is called a lens drive amount FP is given by the following equation.

$FP=DL\cdot S/PTH$

In step (203), the above equation is executed as it is.

In the invention, the defocus amount obtained by the "focus detection" is used as the DL in the case where the foreseeing correction is inhibited. The corrected defocus amount obtained by the "foreseeing calculation" is used as the DL in the case where the foreseeing correction was executed.

In step (204), the FP obtained in step (203) is sent to the lens and the driving of the focus adjusting optical system is commanded.

In the next step (205), the communication is performed with the lens and a check is made to see if the driving of the lens of the lens drive amount FP which was commanded in step (204) has been finished or not. If the driving is finished, step (206) follows and the "lens driving" subroutine is returned to the main routine.

That is, when the FP is input to the counter in the control circuit LPRS in step (204) and the motor is driven in the direction indicated by FP, a monitor signal SENCF (pulse) from the encoder ENCF is counted. When the count value coincides with FP in the counter, the control circuit LPRS stops the motor LMTR and outputs a lens driving stop signal The computer PRS detects the stop signal by the above communication in step (205) and the processing routine is returned to the main routine.

A flow for a "foreseeing calculation" subroutine will now be described with reference to FIG. 8.

In steps (302) and (303), data is updated for the present correcting calculation. That is, the equations (9), (10), and (11) are expressed by the recurrent formula form. At the time of the execution of the correcting calculation, a plurality of past data from that time point are used. In step (302), the data obtained by converting the detected defocus amount into the lens movement amount is updated. In step (303), the data derived by converting the correction defocus amount to be lens driven into the lens movement amount is updated.

Namely, in step (302), the data is updated in order to always set the $DF_1$ and $DF_2$ to the two past latest defocus data. In step (303), the data is updated in order to always set the $DL_1$ and $DL_2$ to the two past latest data. The DLS is input as the $DL_2$. The DLS is the data indicative of the preceding lens movement amount obtained in step (309), which will be explained hereinlater.

In the next step (304), the value of $TM_2$ is stored in $TM_3$ corresponding to the time interval $TM_n$ from the present focus adjusting operation to the next focus adjusting operation. That is, as already mentioned in the description of the equation (11), the time interval $TM_2$ from the past focus adjusting operation to the present focus adjusting operation assumes the time interval $TM_3$ from the present focus adjusting operation to the next focus adjusting operation.

In step (305), the lens coefficient "S" is input from the lens. In step (306), the defocus amount is converted into the lens movement amount. That is, the defocus amount DEF which was at present detected is multiplied by S. The lens movement amount converted value of the present defocus amount is input to $DF_3$.

In the next step (307), the lens movement amount converted value DLS of the defocus amount to be lens driven is obtained by executing the equation (9) or (5). In step (308), the DLS is obtained by executing the equation (10) or (6). In step (309), the DLS is obtained by executing the equation (11) or (8).

In the next step (310), by calculating DL=DLS/S, the lens movement amount is again converted into the defocus amount DL for the "lens drive amount" subroutine. In step (311), the "foreseeing calculation" subroutine is returned to the main program. As mentioned above, the foreseeing lens drive amounts are obtained by the equations (9), (10), and (11) in accordance with the subroutine.

In the invention, as mentioned above, the "foreseeing calculation" subroutine is executed only when it is determined that $A_v<A_0$ in step (008) in FIG. 1, that is, only when the depth of the photographing aperture is shallower than the predetermined value. The lens is driven by the "lens driving" subroutine in the next step (010) by only the lens drive amount obtained by the "foreseeing calculation" subroutine and the lens driving is executed by the foreseeing system. On the other hand, when it is decided that $A_v \geq A_0$ and when the depth is deep, there is no need to execute the foreseeing calculation and the photographing operation in a state in which a focal point is accurately set to an object can be executed by the ordinary focus detecting calculation. Therefore, in such a case, the execution of the "foreseeing calculation" subroutine is inhibited, thereby reducing the processing time.

Although a discrimination reference which is peculiar to each lens has been provided in the embodiment as described above, one discrimination reference value which is common to all of the lenses can be also set. For instance, it is sufficient to use the value of the lens in which the effect of the foreseeing process becomes maximum. On the other hand, in the case of the zoom lens, if the driving characteristic or the like changes depending on the zoom position and the effect of the foreseeing process changes, the discrimination reference value can be also changed in accordance with the zoom position. On the other hand, the timing for transferring the discrimination reference value from the lens to the camera can be set to an arbitrary timing until just before the discrimination with respect to whether the foreseeing calculation is executed or not is made. Further, the discrimination reference values can be provided on the camera side instead of the lens side and the lens is discriminated and the discrimination reference value corresponding to the lens which is mounted can be also used. Such a method is effective in the case where a single reference value which is common to all of the lenses is set. On the other hand, an aperture value which is manually set can be also used as a photographing aperture value $A_v$.

We claim:

1. An automatic focus adjusting apparatus for effecting focus adjusting operations and having a focus detection circuit for repeatedly performing focus detection operations and a lens driving circuit for driving a lens, comprising:
   (a) a calculation circuit having a foreseeing calculation mode in which a control amount for making an object in focus after a predetermined time is calculated on the basis of past focus adjusting operations data output from the focus detection circuit, and a second mode in which the control amount is calculated on the basis of the output of the focus detection circuit irrespective of the past focus adjusting operation data;
   (b) a selection circuit for selecting one mode of said calculation circuit, the lens driving circuit driving the lens in accordance with the control amount obtained in the mode selected by said selection circuit, said selection circuit selecting the one mode in accordance with an exposure factor determining depth of field; and
   (c) a setting circuit for setting the exposure factor.

2. An apparatus according to claim 1, wherein said setting circuit sets an aperture value of said exposure factor.

3. An apparatus according to claim 2, wherein said selection circuit selects the use of the control amount obtained in the foreseeing calculation mode when said aperture value is set to the open side of a predetermined aperture value.

4. An apparatus according to claim 1, wherein said past focus adjusting operation data comprises a defocus signal which was detected by the focus detection circuit.

5. An apparatus according to claim 1, wherein said past focus adjusting operation data comprises a drive amount of the lens.

6. An automatic focus adjusting apparatus for effecting focus adjusting operations and having a focus detection circuit for repeatedly performing focus detection operations and a lens driving circuit for driving a lens, comprising:
   (a) a calculation circuit having a foreseeing calculation mode in which a control amount for making an object in focus after a predetermined time is calculated on the basis of past focus adjusting operation data output from the focus detection circuit, and a second mode in which the control amount is calculated on the basis of the output of the focus detection circuit irrespective of the past focus adjusting operation data;

(b) a setting circuit for setting a photographing factor determining depth of field;

(c) a selection circuit for selecting one mode of said calculation circuit, the lens driving circuit driving the lens in accordance with the control amount obtained in the mode selected by said selection circuit, said selection circuit selecting the one mode in accordance with the photographing factor determining depth of field.

7. An apparatus according to claim 6, wherein said selection circuit selects the use of the control amount obtained in the foreseeing calculation mode when the depth of field upon photographing is shallower than a predetermined depth.

8. An apparatus according to claim 6, wherein said past focus adjusting operation data comprises a defocus signal which was detected by the focus detection circuit.

9. An apparatus according to claim 6, wherein said past focus adjusting operation data is a drive amount of the lens.

10. An auto-focusing apparatus having a calculating circuit for providing foreseeing calculation data to set a focal point to an object after an elapse of a predetermined time on the basis of past focus detection data, comprising:

(a) a driving circuit for driving an imaging optical system on the basis of the foreseeing calculation data from the calculating circuit;

(b) a setting circuit for setting a photographing factor determining depth of field; and (c) an inhibition circuit for inhibiting said driving circuit from driving the optical system on the basis of said forseeing calculation data in accordance with the set photographing factor.

11. An apparatus according to claim 10, wherein said setting circuit sets an aperture value as said photographing factor.

12. An apparatus according to claim 11, wherein said inhibition circuit starts to operate when said aperture value is closer to a stop down side than a predetermined aperture value.

13. An apparatus according to claim 10, wherein said inhibition circuit starts to operate when said photographing factor represents a depth of field deeper than a predetermined depth.

14. A camera having an auto-focusing apparatus with a calculating circuit for providing foreseeing calculation data to set a focal point to an object after an elapse of a predetermined time on the basis of past focus detection data, comprising:

(a) a driving circuit for driving an imaging optical system on the basis of the foreseeing calculation data from the calculating circuit;

(b) a setting circuit for setting a photographing factor determining depth of field; and (c) an inhibition circuit for inhibiting said driving circuit from driving the optical system on the basis of said foreseeing calculation data in accordance with the set photographing factor.

15. A camera according to claim 14, wherein said setting circuit sets an aperture value as said photographing factor.

16. A camera according to claim 15, wherein said inhibition circuit starts to operate when said aperture value is closer to a stop down side than a predetermined aperture value.

17. A camera according to claim 14, wherein said inhibition circuit starts to operate when the photographing factor represents a depth of field deeper than a predetermined depth.

* * * * *

UNITED STATES PATENT AND TRADEMARK OFFICE
CERTIFICATE OF CORRECTION

PATENT NO. : 5,079,581

DATED : January 7, 1992

INVENTOR(S) : Terutake KADOHARA, et al.

It is certified that error appears in the above-identified patent and that said Letters Patent is hereby corrected as shown below:

On the Title page, item,

[57] ABSTRACT
    Line 1, "A" should read --An--.

In the Drawing,
SHEET 1:
    Fig. 1, step (007), "DETETION" should read --DETECTION--.

COLUMN 1:
    Line 13, "used in" should read --of the--;
    Line 14, "of the" should read --used in--;
    Line 31, "adjusted" should read --adjusted.--;
    Line 32, "a" should read --at--;
    Line 56, "of" should be deleted; and
    Line 57, "of" should be deleted.

COLUMN 2:
    Line 40, "$a \cdot t_1^2 + b \cdot t_1 + c = f(t_1)$" should read --$a \cdot t_1^2 + b \cdot t_1 + c = f(t_1)$ .... (2)--.

COLUMN 3:
    Line 37, "$TM_n-1)_2\}$" should read --$TM_{n-1})_2\}$--.

COLUMN 4:
    Line 22, "wa" should read --was--;
    Line 34, "a" should read --an--; and
    Line 62-63, set as a subheading.

COLUMN 5:
    Line 60, "a" should be deleted.

UNITED STATES PATENT AND TRADEMARK OFFICE
CERTIFICATE OF CORRECTION

PATENT NO. : 5,079,581

DATED : January 7, 1992

INVENTOR(S) : Terutake KADOHARA, et al.

It is certified that error appears in the above-identified patent and that said Letters Patent is hereby corrected as shown below:

COLUMN 6:
    Line  9, "ROM" should read --ROM,--; and
    Line 61, "addresses" should read --address--.

COLUMN 7:
    Line 38, "of" should read --of a--; and
    Line 41, "controll" should read --controlled--.

COLUMN 9:
    Line 46, "SW$_2$" should read --switch SW$_2$--; and
    Line 51, "SW$_2$" should read --switch SW$_2$--.

COLUMN 10:
    Line  2, "MSR" should read --M2R--; and
    Line 20, "operations" should read --operation--.

COLUMN 12:
    Line 55, "of" (2nd occurrence) should read --by--.

Signed and Sealed this

Fifteenth Day of June, 1993

Attest:

MICHAEL K. KIRK

*Attesting Officer*   *Acting Commissioner of Patents and Trademarks*